Dec. 24, 1940.　　J. PORST ET AL　　2,226,180
ADJUSTABLE BEARING
Filed Feb. 19, 1940　　2 Sheets-Sheet 1
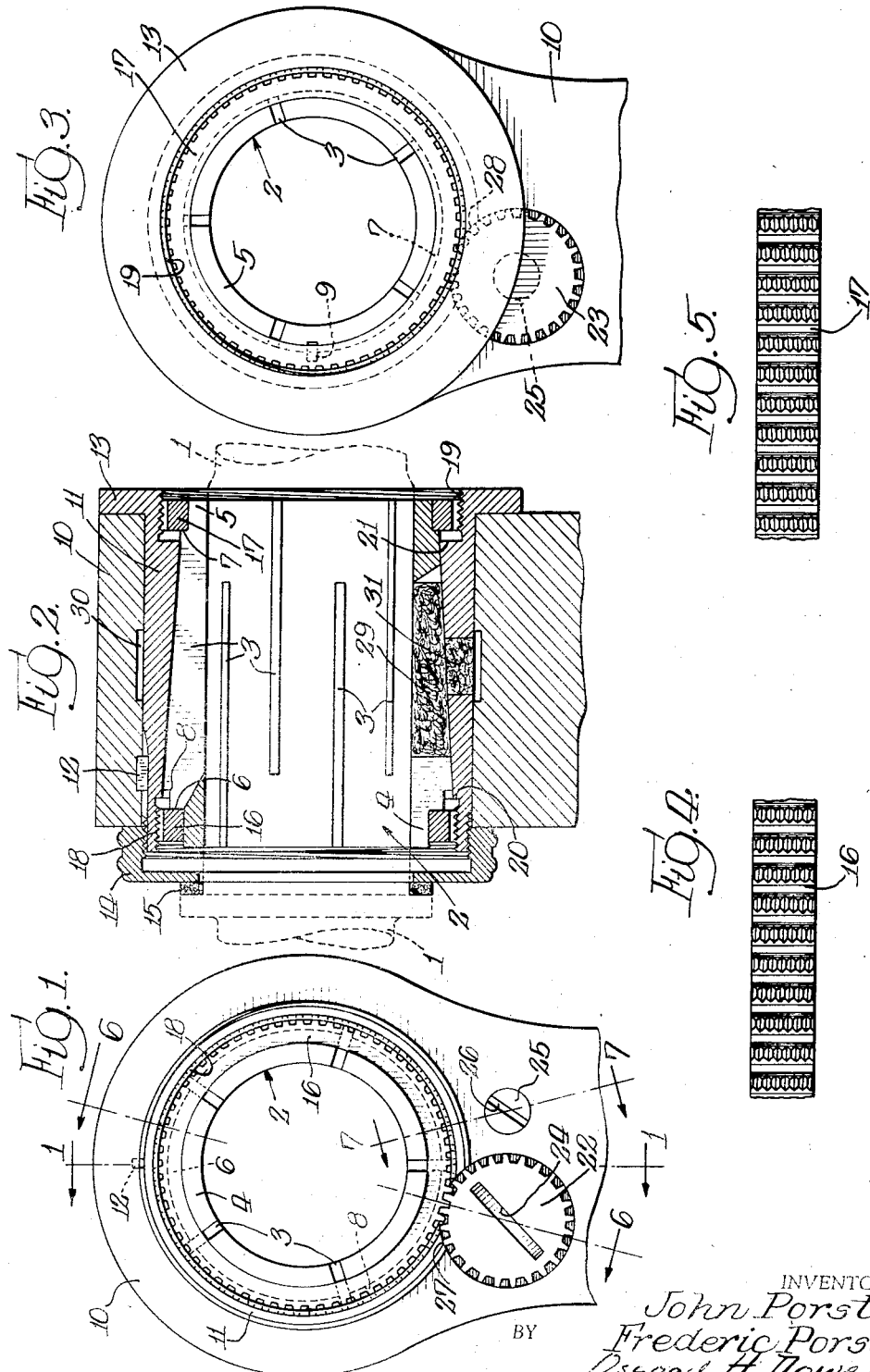

Dec. 24, 1940.  J. PORST ET AL  2,226,180
ADJUSTABLE BEARING
Filed Feb. 19, 1940  2 Sheets-Sheet 2
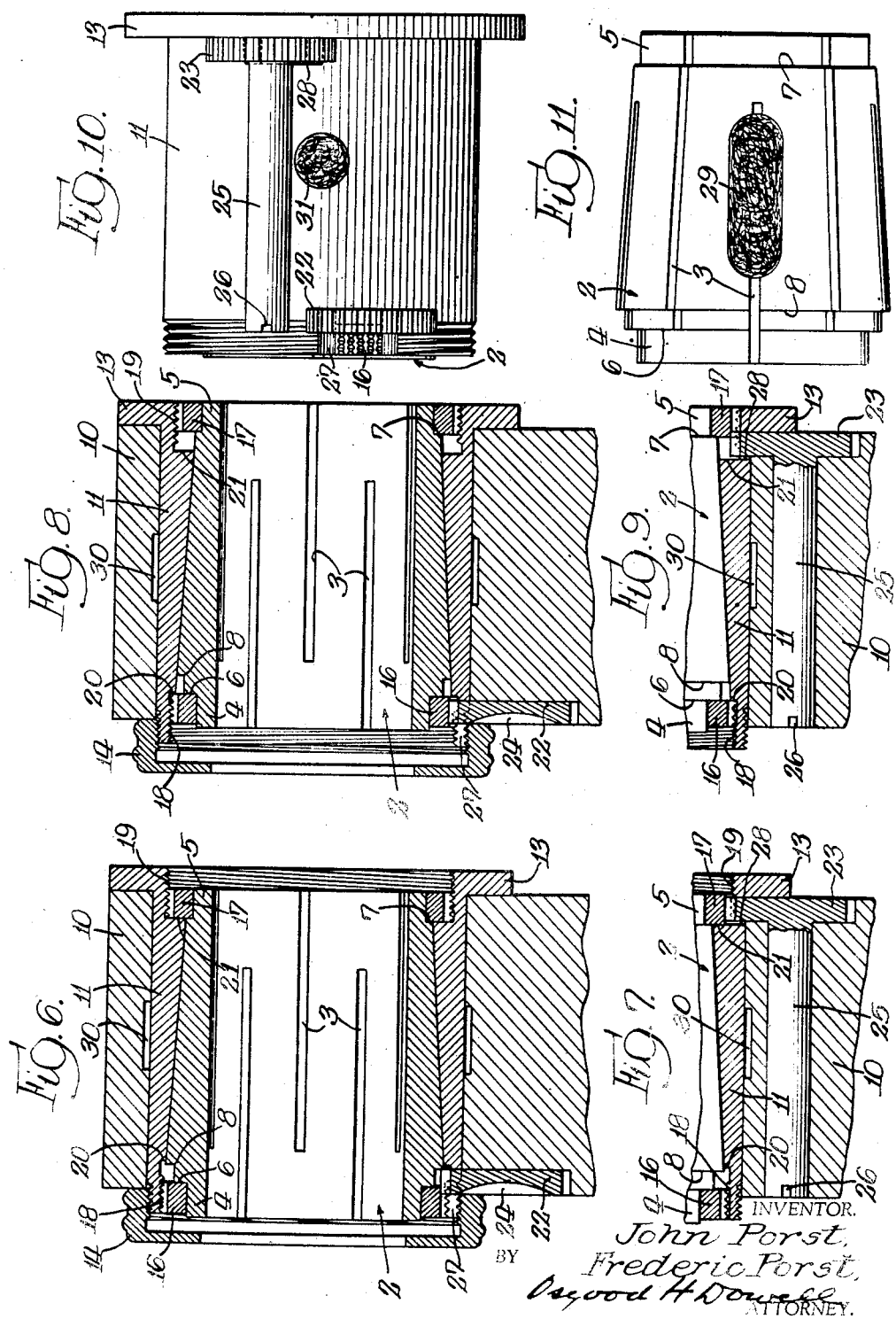
INVENTOR.
John Porst,
Frederic Porst,
BY
Osgood H. Dowell
ATTORNEY.

Patented Dec. 24, 1940

2,226,180

UNITED STATES PATENT OFFICE 2,226,180

ADJUSTABLE BEARING

John Porst and Frederic Porst, Chicago, Ill.

Application February 19, 1940, Serial No. 319,590

10 Claims. (Cl. 308—71)

This invention relates to shaft bearings of the type having split contractible bearing sleeves adjustable to take up wear. Bearings of this type are commonly used for spindles of lathes, drill presses and grinding machines, and may be appropriate for other uses where it is desirable to maintain a close fit between a spindle or shaft and the bearings in which it is journalled.

Objects of the invention are to provide an improved adjusting mechanism for bearings of the type referred to; to provide a bearing of said type which can be accurately adjusted and locked in adjusted position; and to provide an organization of bearing and operating mechanism of practicable, efficient and convenient character.

An illustrative structure embodying the invention in one practicable form is shown in the accompanying drawings. The invention will be described with reference to the structure shown and will be more particularly pointed out and defined in the claims appended to the description.

In said drawings:

Fig. 1 is a front end view of the illustrative structure, omitting its dust cap.

Fig. 2 is a vertical longitudinal section of said structure.

Fig. 3 is a rear end elevation of the same.

Figs. 4 and 5 are detail views representing fragments of screw-threaded adjusting rings embodied in the illustrative structure.

Fig. 6 is a longitudinal sectional view of the illustrated structure taken on a plane through the center of the bearing and axis of its front operating pinion, i. e. on the line 6—6 of Fig. 1, and showing the exteriorly tapered split contractible bearing sleeve locked in its foremost position, before any adjustment thereof for contracting it.

Fig. 7 is a detail view in longitudinal section of a portion of the rear part of the structure, taken on a plane through the center of the bearing and axis of its rear operating pinion, namely on the line 7—7 of Fig. 1, and showing the relative positions of the rear adjusting ring and rear operating pinion when the bearing sleeve is locked in the position shown in Fig. 6.

Fig. 8 is a sectional view similar to Fig. 6 showing the bearing sleeve locked in its rearmost position, after it has been adjusted axially to the full extent permissible.

Fig. 9 is a view similar to Fig. 7 showing the relative positions of the rear adjusting ring and rear operating pinion when the bearing ring is locked in the position shown in Fig. 8.

Fig. 10 is a bottom plan view of the removable bushing containing the split contractible bearing sleeve, together with the gearing in assembly therewith.

Fig. 11 is a bottom plan view of the bearing sleeve.

A spindle journalled in the illustrative bearing structure is indicated only by dotted lines in Fig. 2 of the drawings, said spindle being designated by the numeral 1. This may be assumed to be, for example, the head stock spindle of a lathe; or it may be assumed to be any spindle or shaft for which a bearing embodying the invention may be appropriate.

The illustrative bearing structure comprises an exteriorly tapered split contractible bearing sleeve 2, a housing having a tapered bore in which said sleeve is fitted, and means presently to be described for adjusting the bearing ring axially or longitudinally to contract it and for locking it in its adjusted position.

The bearing sleeve 2 may be any appropriate form of exteriorly tapered split contractible bushing. A preferred form is illustrated in which the sleeve is split by a plurality of longitudinal slots or kerfs 3, certain of said slots extending from one end of the sleeve and arranged in alternation with other of said slots extending from the other end of the sleeve. In the specific construction shown the bearing sleeve 2 is formed with end bosses 4 and 5 and thrust shoulders 6 and 7. At its larger end the bearing sleeve is rabbetted at 8 for a purpose hereinafter indicated. The bearing sleeve is secured against rotation in the housing or bushing in which it is fitted by suitable keying means indicated at 9 in Fig. 3.

A housing having a tapered bore in which the bearing sleeve is fitted is provided by the outer housing 10, which may be a part of any suitable bearing bracket or standard, and the inner housing member 11, the latter being a flanged bushing having a tapered bore and screw threaded ends for engagement by adjusting rings. While the bushing 11 is a desirable feature, it is within contemplation to employ a one-piece housing having a tapered bore and suitably screw threaded at its end portions for engagement by the adjusting rings. Said flanged bushing 11 is fitted in the outer bushing and secured therein against rotation by suitable keying means indicated at 12 in Figs. 1 and 2. The end flange 13 of said bushing overlaps and abuts against the rear end face of the outer housing 10, thereby positioning the adjusting rings in relation to the operating means therefor. The exteriorly screw threaded front end of the bushing 11 protrudes through the front end of the outer housing 10, and a dust cap 14 is screwed thereon against the housing. At 15 is indicated a felt washer interposed between the dust cap and a shoulder on the spindle journalled in the illustrative bearing.

Adjusting rings 16 and 17 having peripheral screw threads of fine pitch are screwed into the opposite ends of the inner housing member of bushing 11, the said end portions of the bushing 11 being interiorly rabbeted and provided with female screw threads 18 and 19 of a pitch corresponding to those on the adjusting rings. Shoulders in the bushing 11 against which the adjusting rings may be screwed home are indicated at 20 and 21. These adjusting rings 16 and 17 are in abutting co-action with the ends of the exteriorly tapered split contractible bearing sleeve 2, and are operable for adjusting said bearing sleeve axially or longitudinally and securing it in adjusted position. As shown, the adjusting rings are journalled respectively on the end bosses 4 and 5 of the bearing sleeve 2 and abut against the thrust shoulders 6 and 7 thereof. It will be understood that by forcing the bearing sleeve 2 rearwardly, said bearing sleeve will be contracted by the co-action of its exterior tapered surface with the interior tapered surface of the bushing 11. To allow this adjustment, the rear adjusting ring 17 must be adjusted in a direction to loosen it or to move it away from the shoulder 7. The front adjusting ring 16 is then screwed inwardly to force the bearing sleeve 2 against the ring 17 or to a position to cause a desired close fit of the bearing sleeve around the shaft or spindle journalled therein. The rear adjusting ring 17 is then tightened or screwed inwardly toward the ring 16 for tightly clamping the bearing sleeve between the two rings. It will be observed that the rabbeted interiorly screw threaded portions 18 and 19 of the bushing 11 are sufficiently long to allow for ample axial adjustments of the bearing sleeve 2 in either direction, before either of said adjusting rings can be screwed home in the bushing 11. The structure is preferably designed so that, as shown more clearly in Figs. 6 and 8, the front surface of the front adjusting ring 16 is flush with the front end of the bushing 11 when the rear adjusting ring 17 is jammed against the shoulder 21, the bearing ring 2 being then in its extreme forward position, before any longitudinal adjustment thereof for contracting it. When the bearing sleeve has been pushed rearwardly to the full extent permissible, the front adjusting ring 16 being then jammed against the shoulder 20, the rear face of the rear adjusting ring is flush with the rear face of the flange 13 of the bushing 11.

To provide for geared connections between the adjusting rings 16 and 17 and operating means, said adjusting rings are shown as gear wheels screw threaded on the tips of the gear teeth, as is apparent from Fig. 2 and more clearly shown in Figs. 4 and 5 which represent enlarged fragments of the adjusting rings. The gear teeth of said rings are respectively engaged by the manually operable pinions 22 and 23 mounted in the outer housing 10 or bearing bracket of which it forms a part, the gear wheel constituting or combined with the front adjusting ring 16 being engaged and operated by the front pinion 22, and the gear wheel constituting or combined with the rear adjusting ring 17 being engaged and operated by the rear pinion 23. The front operating pinion 22 may be simply a flat pinion loosely fitted in a circular recess therefor in the front face of the outer housing 10. Said pinion 22 is shown formed with a slot 24 for engagement by a screw driver. The rear operating pinion 23, similarly fitted in a recess in the back face of the outer housing 10, is fixed on a shaft 25 extending parallel with the axis of the bearing through the outer housing 10. The front end of said shaft 25 is exposed at the front of the housing 10, and is provided with a slot 26 for engagement by a screw driver. By this arrangement, both of the adjusting rings 16 and 17 may be conveniently operated from the front end of the bearing structure.

As is apparent from Figs. 6 to 10, the operating pinions 22 and 23 engage the gear teeth of the respective adjusting rings 16 and 17 through suitable gaps in the female screws of the bushing 11. As shown in Figs. 6 to 10, the front operating pinion 22 engages the gear teeth of the front adjusting ring 16 through a notch 27 in the bushing 11, and the rear operating pinion 23 engages the gear teeth of the rear adjusting ring 17 through a slot 28 in said bushing adjacent to the flange 13. It will be understood that the gear teeth of the adjusting rings are in slidable engagement with the gear teeth of the operating pinions, allowing relative axial movement of the respective adjusting rings. When the bearing sleeve 2 is in its forward position, before any adjustment thereof to contract it, the relationship of the adjusting rings and operating pinions are as shown in Figs. 6 and 7; and when the bearing sleeve has been adjusted or forced rearwardly to the full extent permissible the relative positions of the adjusting rings and operating pinions are as shown in Figs. 8 and 9. As will be apparent from Fig. 6, the function of the rabbeted or cut away portion 8 of the bearing sleeve is to permit it to clear the operating pinion 22 when said bearing sleeve is in its foremost position. As shown in Fig. 3, the rear operating pinion 23 is overlapped by the flange 13 of the bushing 11. So also the dust cap 14 at the front end of the bearing housing will overlap the front operating pinion 22, retaining it in place.

In order that both adjusting rings may be operated by right hand motions of the screw driver for tightening or forcing the adjusting rings against the opposite ends of the bearing sleeve 2, the following convenient arrangement is provided. As shown in Figs. 4 and 5, the front adjusting ring 16 is provided with a left hand screw thread, and the rear adjusting ring 17 is provided with a right hand screw thread. With this arrangement, in conjunction with the operating means shown, it is apparent that a right hand turn of the screw driver applied to the front operating pinion 22 will operate the front adjusting ring 16 in a direction to force it against the shoulder 6; and a right hand operation of the screw driver applied to the slotted front end 26 of the shaft 25 in Fig. 1 will operate the rear adjusting ring 17 in a direction to force it against the shoulder 7. In other words each ring is tightened or operated in a direction to force it toward the other by a right hand operation of the screw driver.

Assuming for example that it is desired to tighten the bearing, the operator applies the screw driver to the slot 26 of the shaft 25 in Fig. 1, and operates it by a left-hand turn or in a counter clockwise direction, thereby operating the rear adjusting ring 17 in a direction to unscrew it, thus shifting it axially away from the shoulder 7. By a right-hand operation or clockwise rotation of the screw driver applied to the pinion 22, the front adjusting ring 16, being provided with a left hand screw thread, will be operated to force the tapered split contractible bearing sleeve rearwardly or in a direction to contract it. When said bearing sleeve is so adjusted as to obtain the desired contraction or closeness of fit of the bearing sleeve on the shaft or spindle journalled therein, the rear adjusting ring 17 is then operated by a right-hand motion of the screw driver applied to 26 in Fig. 1, so as to force said ring 17 tightly against the shoulder 7. The bearing sleeve is thus clamped between the two adjusting rings and, as the latter are in geared connection with the pinions 22 and 23, they are held against rotation, so that the bearing is effectually locked in its adjusted position. If the bearing should be too tight, the front adjusting ring is operated to loosen it; the rear adjusting ring is operated to tighten it, and the front ring is then tightened to effect locking of the bearing.

For lubricating the bearing, there is shown in Figs. 2 and 11 an oil pad 29 of suitable absorbent material fitted in a recess in the bottom of the bearing sleeve 2. Oil is conducted from the bottom of the oil groove 30 in the outer housing 10 to the oil pad 28 through the wick 31 in a hole in the inner housing or bushing 11. Oil may be fed to the groove 30 from any suitable oil cap, not shown.

Obviously the illustrative structure is susceptible of various modifications in form, proportions and details of construction to suit different requirements and conditions. It will be understood that the invention is not limited to the specific embodiment shown, and that the foregoing description is not to be taken as limiting beyond the terms of the appended claims.

The feature of the co-acting tapered surfaces of the bearing sleeve 2 and bushing 11 in which it is fitted may be considered as exemplifying co-acting means in a bearing structure one of which means is adapted to be forced into wedging co-action with the other to contract the diameter of the shaft bearing surface, such movable means being operable by adjusting rings in screw-threaded engagement with the bearing housing.

We claim as our invention:

1. A shaft bearing comprising an exteriorly tapered split contractible bearing sleeve, a housing having a tapered bore in which said sleeve is fitted, adjusting rings enclosed by and in screw threaded connection with opposite end portions of said housing and in abutting co-action with said bearing sleeve, and manually operable means carried by said housing and respectively in geared connection with said adjusting rings for operating them.

2. A shaft bearing comprising an exteriorly tapered split contractible bearing sleeve, a housing having a tapered bore in which said sleeve is fitted, adjusting rings enclosed by and in screw threaded connection with opposite end portions of said housing and in abutting co-action with said bearing sleeve, and a pair of manually operable means carried by said housing and respectively in geared connection with the respective adjusting rings for operating them, the operating means for each of said rings being operable from one end of the housing.

3. A shaft bearing comprising an exteriorly tapered split contractible bearing sleeve, a housing having a tapered bore in which said sleeve is fitted, adjusting rings screwed into the end portions of said housing in abutting co-action with the opposite end portions of said bearing sleeve, said adjusting rings comprising peripherally screw-threaded gear wheels in threaded engagement with said end portions of the housing, and operating pinions mounted in said housing and engaging the gear teeth of the respective adjusting rings, said rings having the screw threads thereof formed on the tips of the gear teeth thereof.

4. A shaft bearing comprising an exteriorly tapered split contractible bearing sleeve, a housing having a tapered bore in which said sleeve is fitted, adjusting rings screwed into the end portions of said housing in abutting co-action with the opposite end portions of said bearing sleeve, said adjusting rings comprising peripherally screw-threaded gear wheels in threaded engagement with said end portions of the housing, and operating pinions mounted in said housing and engaging the gear teeth of the respective adjusting rings, both of said pinions being operable from one end of the housing.

5. A shaft bearing comprising an exteriorly tapered split contractible bearing sleeve, a housing having a tapered bore in which said sleeve is fitted, adjusting rings screwed into the end portions of said housing in abutting co-action with the opposite end portions of said bearing sleeve, said adjusting rings comprising peripherally screw-threaded wheels in threaded engagement with said end portions of the housing, and operating pinions mounted in said housing and engaging the gear teeth of the respective adjusting rings, both of said pinions being operable from one end of the housing, one of said adjusting rings having a right-hand screw thread and the other a left-hand screw thread.

6. A shaft bearing comprising an outer housing, a bushing therein having a tapered bore, an exteriorly tapered split contractible bearing sleeve fitted in said bushing, adjusting rings within the end portions of said bushing for adjusting and holding said bearing sleeve, said adjusting rings comprising peripherally screw-threaded gear wheels in threaded engagement with the bushing and in abutting co-action with said bearing sleeve, and operating pinions mounted in the outer housing and respectively engaging the gear teeth of said adjusting rings, said bushing having cut away portions to permit such engagement, the adjusting rings being axially movable relative to said pinions and said bearing sleeve being clear of said pinions.

7. A shaft bearing comprising an outer housing, a bushing therein having a tapered bore, an exteriorly tapered split contractible bearing sleeve fitted in said bushing, adjusting rings within the end portions of said bushing for adjusting and holding said bearing sleeve, said adjusting rings comprising peripherally screw-threaded gear wheels in threaded engagement with the bushing and in abutting co-action with said bearing sleeve, and operating pinions mounted in the outer housing and respectively engaging the gear teeth of said adjusting rings, said bushing having cut away portions to permit such engagement, the adjusting rings being axially movable relative to said pinions and said bearing sleeve being clear of said pinions, the arrangement being such that when either of said adjusting rings is screwed home in the bushing the other is substantially flush with the opposite end of the bushing, said bearing sleeve having end bosses enclosed by said adjusting rings and thrust shoulders against which the rings bear, and the distance between said shoulders being such that the bearing sleeve is adapted to be clamped between the two adjusting rings in either of the two extreme positions referred to.

8. A shaft bearing comprising an outer housing, a bushing therein having a tapered bore, said bushing having an end flange for abutting one end of the housing, an exteriorly tapered split contractible bearing sleeve fitted in said bushing, annular means mounted in the end portions of said bushing and operable for axially adjusting said bearing sleeve and securing it in its adjusted position, and manually operable means mounted in said outer housing for operating said annular means, said bushing and parts therein contained constituting a unit which as such may be inserted with the housing and assembled with the operating means, at least a portion of the operating means being removable while the unit is in place and the unit as such being detachable from the housing after removal of such portion of the operating means.

9. A shaft bearing comprising a housing having a tapered bore, an exteriorly tapered split contractible bearing sleeve fitted therein, and adjusting rings concentric with said sleeve and in screw-threaded connection with the housing for axially adjusting said bearing sleeve and securing it in adjusted position, said sleeve having end bosses on which said adjusting rings are journaled and thrust shoulders of larger diameter than said bosses and against which said rings bear.

10. A shaft bearing comprising an outer housing, a bushing therein having a tapered bore, an exteriorly tapered split contractible bearing sleeve fitted in said bushing, adjusting rings within the end portions of said bushing for adjusting and holding said bearing sleeve, said adjusting rings comprising peripherally screw-threaded gear wheels in threaded engagement with the bushing and in abutting co-action with said bearing sleeve, and operating pinions mounted in the outer housing and respectively engaging the gear teeth of said adjusting rings, said bushing having cut away portions to permit such engagement, the adjusting rings being axially movable relative to said pinions and said bearing sleeve being clear of said pinions, said bearing sleeve having end bosses enclosed by said adjusting rings and thrust shoulders against which the rings bear, the distance between said shoulders being greater than the distance between the inner limits of adjustment of said rings.

JOHN PORST.
FREDERIC PORST.